(12) United States Patent
Yasuda

(10) Patent No.: US 11,060,470 B2
(45) Date of Patent: Jul. 13, 2021

(54) ENGINE DEVICE

(71) Applicant: TOYOTA JIDOSHA KABUSHIKI KAISHA, Toyota (JP)

(72) Inventor: Hiromichi Yasuda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/997,373

(22) Filed: Aug. 19, 2020

(65) Prior Publication Data

US 2021/0062740 A1 Mar. 4, 2021

(30) Foreign Application Priority Data

Sep. 4, 2019 (JP) .............................. JP2019-161288

(51) Int. Cl.
*F02M 25/08* (2006.01)
*F02D 41/00* (2006.01)

(52) U.S. Cl.
CPC ..... *F02D 41/0032* (2013.01); *F02D 41/0007* (2013.01); *F02M 25/0836* (2013.01); *F02D 2200/04* (2013.01)

(58) Field of Classification Search
CPC ............. F02M 41/0032; F02M 41/007; F02M 2200/04; F02M 25/0836
See application file for complete search history.

(56) References Cited

U.S. PATENT DOCUMENTS

| | | | | |
|---|---|---|---|---|
| 4,530,210 A * | 7/1985 | Yamazaki | ............ | F02M 25/089 |
| | | | | 123/520 |
| 5,190,015 A * | 3/1993 | Nakata | .................. | F02D 41/004 |
| | | | | 123/518 |
| 5,979,418 A * | 11/1999 | Saruwatari | .......... | F02D 41/0032 |
| | | | | 123/519 |
| 7,913,672 B2 * | 3/2011 | Elwart | ................. | F02M 25/089 |
| | | | | 123/519 |
| 10,100,784 B2 * | 10/2018 | Gerbig | .................... | F02B 37/16 |
| 10,316,799 B2 * | 6/2019 | Tawa | ..................... | F02M 35/02 |
| 10,316,842 B2 * | 6/2019 | Oshiro | .................. | F04C 29/124 |
| 10,677,199 B2 * | 6/2020 | Hashimoto | ........... | F02D 41/221 |
| 10,697,408 B2 * | 6/2020 | Asanuma | ......... | F02M 35/10255 |
| 10,851,735 B2 * | 12/2020 | Nakata | ............... | F02M 25/0809 |
| 10,883,451 B2 * | 1/2021 | Yasuda | ............. | F02M 25/0836 |
| 2004/0237946 A1 * | 12/2004 | Murakami | ............ | F02M 25/08 |
| | | | | 123/520 |
| 2013/0199504 A1 | 8/2013 | Takeishi et al. | | |
| 2015/0308310 A1 * | 10/2015 | Pursifull | .............. | F01M 13/022 |
| | | | | 123/403 |

FOREIGN PATENT DOCUMENTS

JP 2013-160108 A 8/2013

\* cited by examiner

*Primary Examiner* — Thomas N Moulis

(74) *Attorney, Agent, or Firm* — Oblon, McClelland, Maier & Neustadt, L.L.P.

(57) ABSTRACT

An engine device is provided with a fuel vapor processor comprising a first supply pipe configured to supply a vaporized fuel gas including fuel vapor generated in the fuel tank, to a downstream side of the compressor in the intake pipe; a first valve provided in the first supply pipe; a second supply pipe configured to supply the vaporized fuel gas to an upstream side of the compressor in the intake pipe; a second valve provided in the second supply pipe; and a buffer portion provided on an intake pipe side of the second valve in the second supply pipe and configured to adsorb at least part of the fuel vapor.

7 Claims, 3 Drawing Sheets

ENGINE DEVICE

CROSS-REFERENCE TO RELATED APPLICATIONS

The present disclosure claims priority to Japanese Patent Application No. 2019-161288 filed on Sep. 4, 2019, which is incorporated herein by reference in its entirety including specification, drawings and claims.

TECHNICAL FIELD

The present disclosure relates to an engine device.

BACKGROUND

A proposed configuration of an engine device includes an engine configured to receive a supply of a fuel from a fuel tank, a supercharger having a compressor that is placed in an intake pipe of the engine, and a fuel vapor processor (as described in, for example, JP 2013-160108A). The fuel vapor processor is provided with a canister that is filled with an adsorbent, such as active carbon. The canister is connected with the fuel tank via a conduit pipe and is also connected with a purge pipe. The purge pipe is provided with a purge valve. A downstream side of the purge valve in the purge pipe (i.e., an opposite side to the canister) is branched off into a first purge passage that is connected with a downstream side of the compressor in the intake pipe and a second purge passage that is connected with an upstream side of the compressor in the intake pipe. The second purge passage is provided with an ejector that is operated by the supercharged air generated by the compressor. The first purge passage is provided with a first check valve that is opened by a negative pressure in the intake pipe. The second purge passage is provided with a second check valve that is opened by operation of the ejector. This engine device supplies the fuel vapor to the upstream side of the compressor in the intake by operation of the ejector during supercharging operation.

SUMMARY

The engine device described above has the fuel vapor processor of the complicated configuration due to, for example, the need for the ejector. In order to solve this problem, the applicant has proposed the configuration of a fuel vapor processor including a first supply pipe configured to supply a vaporized fuel gas including fuel vapor generated in a fuel tank, to a downstream side of a compressor in an intake pipe of an engine; a first valve provided in the first supply pipe; a second supply pipe configured to supply the vaporized fuel gas to an upstream side of the compressor in the intake pipe; and a second valve provided in the second supply pipe by the disclosure of Japanese Patent Application 2018-201493. In this configuration, however, there is a possibility that the air fuel ratio of the engine abruptly changes when the second valve is opened to supply the vaporized fuel gas to the intake pipe via the second supply pipe. An abrupt change in the air fuel ratio of the engine is likely to cause deterioration of emission and deterioration of drivability of a vehicle when the engine device is mounted on the vehicle.

A major object of an engine device of the present disclosure is to suppress an abrupt change in air fuel ratio of an engine when a second valve of a fuel vapor processor is opened to supply a vaporized fuel gas including fuel vapor generated in a fuel tank, to an intake pipe.

In order to achieve the above main object, the engine device of the present disclosure employs the following configuration.

The present disclosure is directed to an engine device. The engine device includes an engine configured to receive a supply of a fuel from a fuel tank and output a power; and a supercharger having a compressor that is placed in an intake pipe of the engine. The engine device also includes a fuel vapor processor comprising a first supply pipe configured to supply a vaporized fuel gas including fuel vapor generated in the fuel tank, to a downstream side of the compressor in the intake pipe; a first valve provided in the first supply pipe; a second supply pipe configured to supply the vaporized fuel gas to an upstream side of the compressor in the intake pipe; a second valve provided in the second supply pipe; and a buffer portion provided on an intake pipe side of the second valve in the second supply pipe and configured to adsorb at least part of the fuel vapor.

The engine device of this aspect is provided with the fuel vapor processor comprising the first supply pipe configured to supply the vaporized fuel gas including the fuel vapor generated in the fuel tank, to the downstream side of the compressor in the intake pipe; the first valve provided in the first supply pipe; the second supply pipe configured to supply the vaporized fuel gas to the upstream side of the compressor in the intake pipe; the second valve provided in the second supply pipe; and the buffer portion provided on the intake pipe side of the second valve in the second supply pipe and configured to adsorb at least part of the fuel vapor. Providing the buffer portion causes at least part of the fuel vapor included in the vaporized fuel gas from the fuel tank to be once adsorbed in the buffer portion, to be then released and to be supplied to the intake pipe, when the second valve is opened. This configuration suppresses a large amount of the fuel vapor from being abruptly supplied to the intake pipe when the second valve is opened and thereby suppresses an abrupt change in the air fuel ratio of the engine. As a result, this configuration suppresses deterioration of emission and deterioration of the drivability of a vehicle when the engine device is mounted on the vehicle.

DESCRIPTION OF EMBODIMENTS

The following describes some aspects of the disclosure with reference to embodiments.

Figure 1:
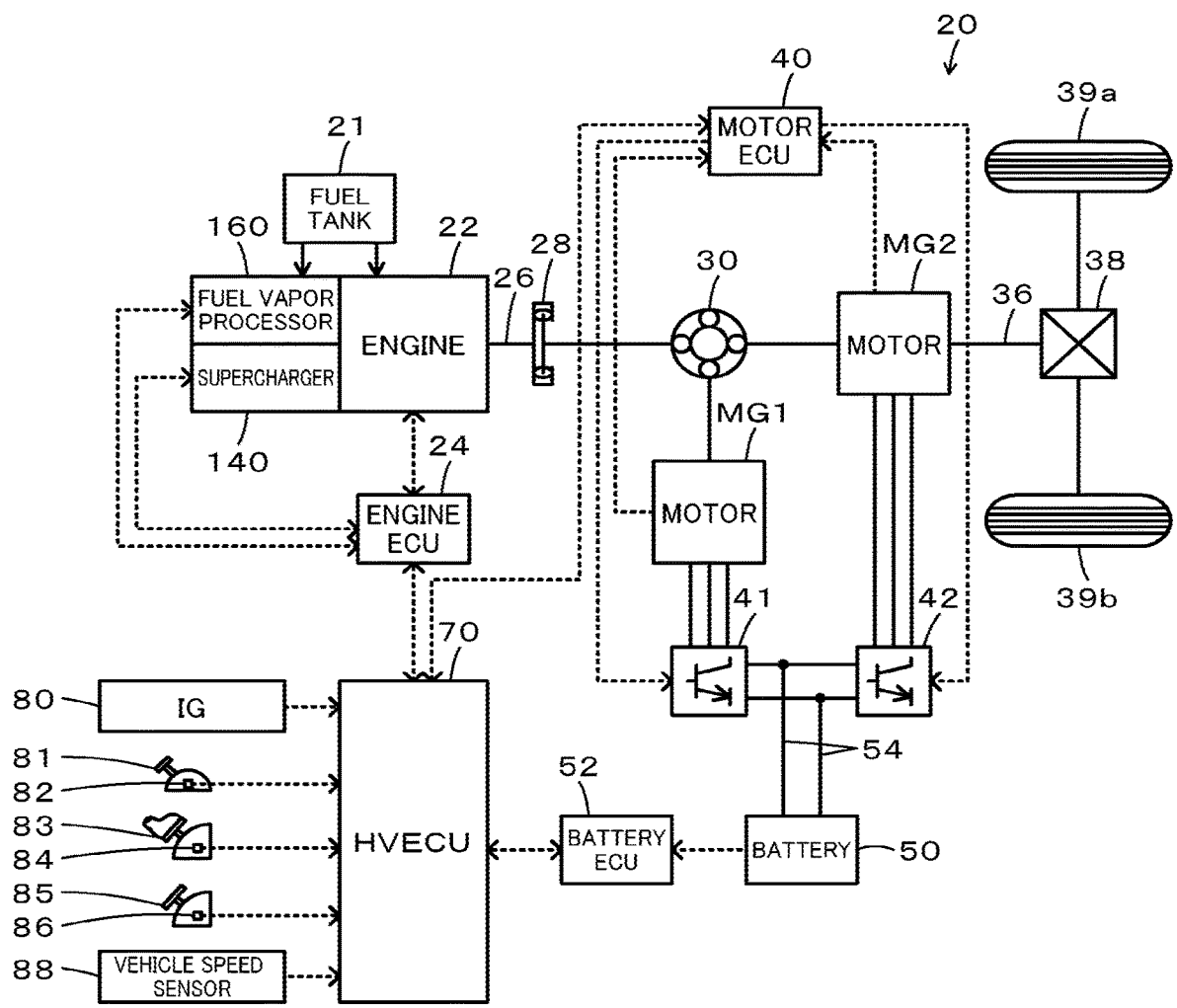
FIG. 1 is a configuration diagram illustrating the schematic configuration of a hybrid vehicle 20 with an engine device according to an embodiment of the present disclosure mounted thereon.

FIG. 1 is a configuration diagram illustrating the schematic configuration of a hybrid vehicle 20 with an engine device according to an embodiment of the present disclosure mounted thereon. As shown in FIG. 1, the hybrid vehicle 20 of the embodiment includes an engine 22, a supercharger 140, a fuel vapor processor 160, and an engine electronic control unit (hereinafter referred to as "engine ECU") 24. The hybrid vehicle 20 also includes a planetary gear 30, motors MG1 and MG2, inverters 41 and 42, a motor electronic control unit (hereinafter referred to as "motor ECU") 40, a battery 50, a battery electronic control unit (hereinafter referred to as "battery ECU") 52, and a hybrid electronic control unit (hereinafter referred to as "HVECU") 70. According to the embodiment, the engine 22, the supercharger 140, the fuel vapor processor 160 and the engine ECU 24 correspond to the "engine device".

The engine 22 is configured as an internal combustion engine to output power by using a fuel such as gasoline or light oil supplied from a fuel tank 21 via a feed pump and piping (neither shown). The supercharger 140 is used for supercharging operation of the engine 22. The fuel vapor processor 160 is configured to supply a vaporized fuel gas including fuel vapor generated in the fuel tank 21, to the engine 22. The engine ECU 24 controls the engine 22, the supercharger 140 and the fuel vapor processor 160.

The planetary gear 30 is configured as a single pinion-type planetary gear mechanism. The planetary gear 30 includes a sun gear that is connected with a rotor of the motor MG1. The planetary gear 30 also includes a ring gear that is connected with a driveshaft 36 which is coupled with drive wheels 39a and 39b via a differential gear 38. The planetary gear 30 further includes a carrier that is connected with the crankshaft 26 of the engine 22 via a damper 28.

The motor MG1 is configured, for example, as a synchronous generator motor and has the rotor that is connected with the sun gear of the planetary gear 30 as described above. The motor MG2 is configured, for example, as a synchronous generator motor and has a rotor that is connected with the driveshaft 36. The inverters 41 and 42 are used to drive the motors MG1 and MG2 and are connected with the battery 50 via power lines 54. The motor ECU 40 performs switching control of a plurality of switching elements (not shown) included in the inverters 41 and 42, so as to rotate and drive the motors MG1 and MG2.

The battery 50 is configured as, for example, a lithium ion rechargeable battery or a nickel metal hydride battery and is connected with the inverters 41 and 42 via the power lines 54. The battery 50 is under management of the battery ECU 52.

The HVECU 70 controls the entire hybrid vehicle 20. Signals from various sensors are input into the HVECU 70 via its input port. The signals input into the HVECU 70 include, for example, an ignition signal from an ignition switch 80 and a shift position SP from a shift position sensor 82 configured to detect an operating position of a shift lever 81. The input signals also include an accelerator position Acc from an accelerator pedal position sensor 84 configured to detect a depression amount of an accelerator pedal 83, a brake pedal position BP from a brake pedal position sensor 86 configured to detect a depression amount of a brake pedal 85 and a vehicle speed V from a vehicle speed sensor 88. The HVECU 70 is connected with the engine ECU 24, the motor ECU 40 and the battery ECU 52 via respective communication ports.

The hybrid vehicle 20 of the embodiment having the configuration described above is driven in a hybrid drive mode (HV drive mode) with operation of the engine 22 or is driven in an electric drive mode (EV drive mode) with stop of operation of the engine 22.

Figure 2:
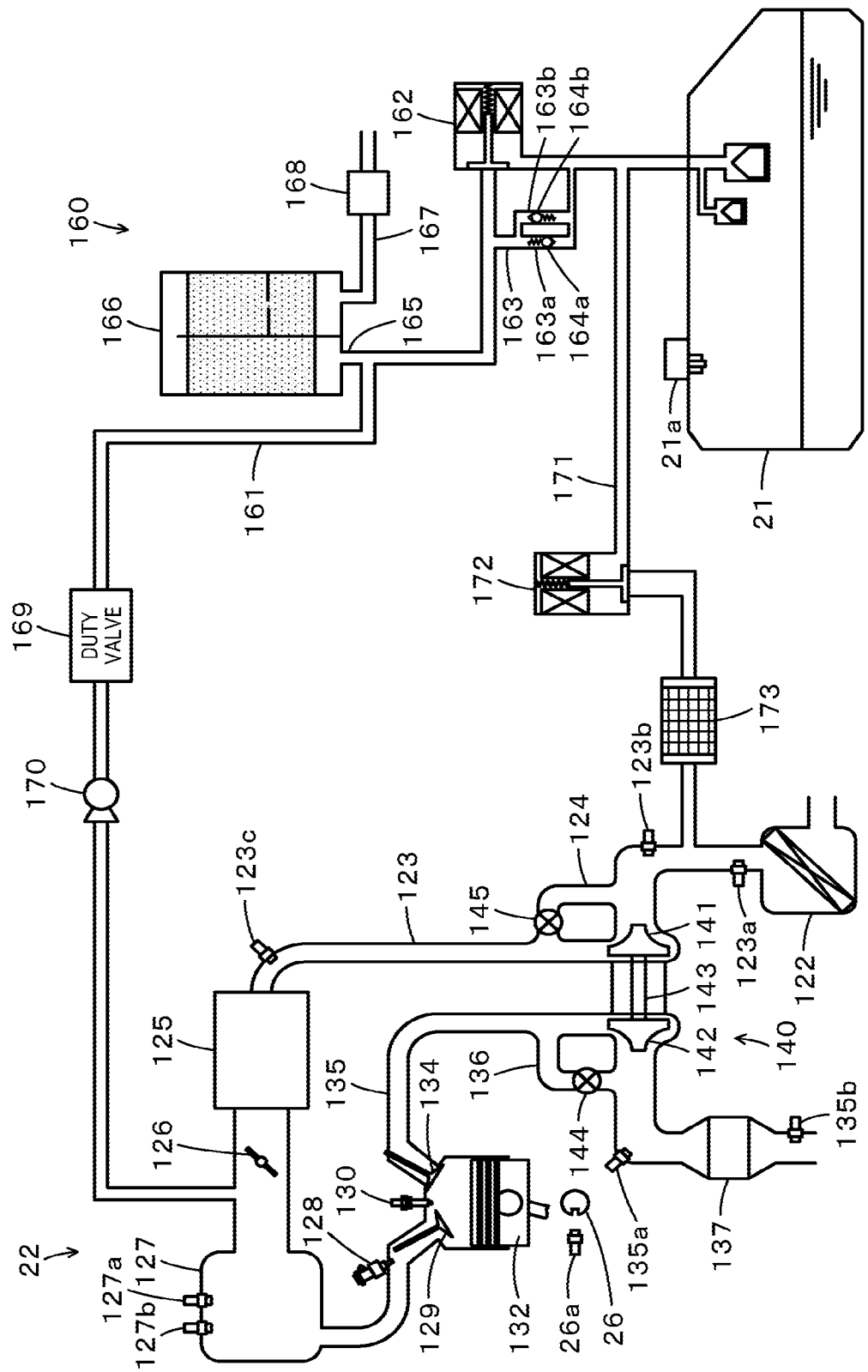
FIG. 2 is a configuration diagram illustrating the schematic configuration of the engine 22, the supercharger 140 and the fuel vapor processor 160.

The following describes the details of the engine device mounted on the hybrid vehicle 20 (the engine 22, the supercharger 140, the fuel vapor processor 160 and the engine ECU 24). FIG. 2 is a configuration diagram illustrating the schematic configuration of the engine 22, the supercharger 140 and the fuel vapor processor 160. As shown in FIG. 2, in the engine 22, the air cleaned by an air cleaner 122 and taken into an intake pipe 123 is made to sequentially flow through an intercooler 125, a throttle valve 126 and a surge tank 127 and is mixed with a fuel injected from a fuel injection valve 128 that is provided on a downstream side of the surge tank 127 in the intake pipe 123. This air fuel mixture is drawn into a combustion chamber via an intake valve 129 and is explosively combusted with an electric spark generated by a spark plug 130. The reciprocating motion of a piston 132 that is pressed down by the energy of the explosive combustion is converted into rotating motion of a crankshaft 26. The exhaust gas discharged from the combustion chamber via an exhaust valve 134 to an exhaust pipe 135 is released to the outside air via an exhaust gas controller 137 that is provided with a catalyst (three-way catalyst) serving to convert toxic components such as carbon monoxide (CO), hydrocarbons (HC) and nitrogen oxides (NOx) into less toxic components.

The supercharger 140 is configured as a turbo charger and includes a compressor 141, a turbine 142, a rotating shaft 143, a waste gate valve 144, and a blow off valve 145. The compressor 141 is provided on an upstream side of the intercooler 125 in the intake pipe 123. The turbine 142 is provided on an upstream side of the exhaust gas controller 137 in the exhaust pipe 135. The rotating shaft 143 is provided to link the compressor 141 with the turbine 142. The waste gate valve 144 is provided in a bypass pipe 136 that serves to connect an upstream side of the turbine 142 with a downstream side thereof in the exhaust pipe 135, and is controlled by the engine ECU 24. The blow off valve 145 is provided in a bypass pipe 124 that serves to connect an upstream side of the compressor 141 with a downstream side thereof in the intake pipe 123, and is controlled by the engine ECU 24.

In this supercharger 140, the opening position of the waste gate valve 144 is regulated to regulate the distribution ratio of the amount of the exhaust gas flowing through the bypass pipe 136 to the amount of the exhaust gas flowing through the turbine 142, to regulate the rotational driving power of the turbine 142, to regulate the amount of the compressed air by the compressor 141 and to regulate the boost pressure (intake pressure) of the engine 22. More specifically, the distribution ratio is regulated such as to decrease the amount of the exhaust gas flowing through the bypass pipe 136 and to increase the amount of the exhaust gas flowing through the turbine 142 with a reduction in the opening position of the waste gate valve 144. When the waste gate valve 144 is fully opened, the engine 22 can be operated like a naturally aspirated engine without the supercharger 140.

In the supercharger 140, when the pressure on a downstream side of the compressor 141 in the intake pipe 123 is rather higher than the pressure on an upstream side thereof, the blow off valve 145 is opened to release the excess pressure on the downstream side of the compressor 141. The blow off valve 145 may be configured, in place of the valve controlled by the engine ECU 24, as a check valve that is opened when the pressure on the downstream side of the compressor 141 in the intake pipe 123 is rather higher than the pressure on the upstream side thereof.

The fuel vapor processor 160 includes a piping 161, an on-off valve 162, a bypass pipe 163, relief valves 164a and 164b, a canister 166, an air filter 168, a duty valve 169 and a check valve 170. The piping 161 is connected between the fuel tank 21 and a location between the throttle valve 126 and the surge tank 127 in the intake pipe 123. The on-off valve 162 is provided in the piping 161, is configured as a normally-closed electromagnetic valve and is controlled by the engine ECU 24.

The bypass pipe 163 is configured to bypass an upstream side and a downstream side of the on-off valve 162 in the piping 161 and has branch portions 163a and 163b that are branched off into two and are then joined again. The relief valve 164a is provided in the branch portion 163a, is configured as a check valve, and is opened when the pressure on the fuel tank 21-side becomes rather higher than the pressure on the opposite side (i.e., on the intake pipe 123-side). The relief valve 164b is provided in the branch portion 163b, is configured as a check valve, and is opened when the pressure on the opposite side to the fuel tank 21 becomes rather higher than the pressure on the fuel tank 21-side.

The canister 166 has one end side in a gas flow pathway that is connected with the intake pipe 123-side of the on-off valve 162 in the piping 161 via a piping 165 and the other end side that is released to the atmosphere via a piping 167. The inside (gas flow pathway) of the canister 166 is filled with an adsorbent, such as active carbon, which is capable of adsorbing the fuel vapor from the fuel tank 21. The air filter 168 is provided in the piping 167.

The duty valve 169 is provided on the intake pipe 123-side of a connecting position with the piping 165 (the canister 166) in the piping 161, is configured as a normally-closed electromagnetic valve, and is controlled by the engine ECU 24. The check valve 170 is provided on the intake pipe 123-side of the duty valve 169 in the piping 161 and is opened when the pressure on the intake pipe 123-side becomes rather lower than the pressure on the opposite side (i.e., on the fuel tank 21-side).

The fuel vapor processor 160 includes a piping 171, an on-off valve 172 and a buffer portion 173. The piping 171 is connected between the fuel tank 21-side of the on-off valve 162 in the piping 161 and a location between the air cleaner 122 and the compressor 141 of the supercharger 140 in the intake pipe 123. The on-off valve 172 is provided in the piping 171, is configured as a normally-closed electromagnetic valve, and is controlled by the engine ECU 24. The buffer portion 173 is provided on the intake pipe 123-side of the on-off valve 172 in the piping 171. The inside of the buffer portion 173 is filled with an adsorbent, such as active carbon, which is capable of adsorbing the fuel vapor from the fuel tank 21. The operations of the fuel vapor processor 160 will be described later.

The engine ECU 24 (shown in FIG. 1) is configured as a CPU-based microprocessor and includes a ROM configured to store processing programs, a RAM configured to temporarily store data, input/output ports and a communication port, in addition to the CPU. Signals from various sensors required for controlling the engine 22, the supercharger 140 and the fuel vapor processor 160 are input into the engine ECU 24 via the input port.

The signals input into the engine ECU 24 include, for example, a pressure Pt from a pressure sensor 21a configured to detect the pressure in the fuel tank 21, a crank position θcr from a crank position sensor 26a configured to detect the rotational position of the crankshaft 26 of the engine 22, a cooling water temperature Tw from a water temperature sensor (not shown) configured to detect the temperature of cooling water in the engine 22, and a throttle valve position TH from a throttle valve position sensor (not shown) configured to detect the opening position of the throttle valve 126. The input signals also include a cam position θca from a cam position sensor (not shown) configured to detect the rotational position of an intake cam shaft that opens and closes the intake valve 129 or the rotational position of an exhaust cam shaft that opens and closes the exhaust valve 134. The input signals further include an intake air flow Qa from an air flowmeter 123a located between the air cleaner 122 and the compressor 141 of the supercharger 140 in the intake pipe 123, an intake pressure Pin from a pressure sensor 123b located between the air cleaner 122 and the compressor 141 in the intake pipe 123, and a boost pressure Pc from a pressure sensor 123c located between the compressor 141 and the intercooler 125 in the intake pipe 123. The input signals also include a surge pressure Ps from a pressure sensor 127a mounted to the serge tank 127 and a surge temperature Ts from a temperature sensor 127b mounted to the surge tank 127. The input signals additionally include a front air fuel ratio AF1 from an air fuel ratio sensor 135a located on an upstream side of the exhaust gas controller 137 in the exhaust pipe 135 and an air fuel ratio AF2 from an air fuel ratio sensor 135b located on a downstream side of the exhaust gas controller 137 in the exhaust pipe 135. The input signals further include a waste gate valve position WG from a waste gate valve position sensor (not shown) configured to detect the opening position of the waste gate valve 144.

Various control signals for controlling the engine 22, the supercharger 140 and the fuel vapor processor 160 are output from the engine ECU 24 via the output port. The signals output from the engine ECU 24 include, for example, a control signal to the throttle valve 126, a control signal to the fuel injection valve 128, and a control signal to the spark plug 130. The output signals also include a control signal to the waste gate valve 144, a control signal to the blow off valve 145, a control signal to the on-off valve 162, a control signal to the duty valve 169 and a control signal to the on-off valve 172.

The engine ECU 24 calculates a rotation speed Ne of the engine 22, based on the crank position θcr input from the crank position sensor 26a. The engine ECU 24 also calculates a volumetric efficiency KL (ratio of the volume of the intake air actually taken in one cycle to the stroke volume per cycle of the engine 22), based on the intake air flow Qa input from the air flowmeter 123a and the rotation speed Ne of the engine 22.

The following describes operations of the engine device mounted on the hybrid vehicle 20 or more specifically operations of the fuel vapor processor 160 and the engine ECU 24. The on-off valves 162 and 172 and the duty valve 169 are all configured as normally-closed electromagnetic valves as described above.

In the case of fueling to the fuel tank 21, the on-off valve 162 is opened by the engine ECU 24. This valve-opening causes the vaporized fuel gas including fuel vapor generated in the fuel tank 21 to flow through the piping 161 and the piping 165 into the canister 166. This then causes the fuel vapor included in the vaporized fuel gas to be adsorbed in the canister 166, while causing the components other than the fuel vapor to be released to the atmosphere via the piping 167 (including the air filter 168). In this state, the duty valve 169 and the on-off valve 172 are not controlled by the engine ECU 24 but are kept closed.

When the engine 22 is at stop (except during fueling), for example, during a system stop or during drive in the EV drive mode, the on-off valves 162 and 172 are not controlled by the engine ECU 24 but are kept closed. Keeping the on-off valve 162 closed suppresses the vaporized fuel gas in the fuel tank 21 from flowing into the canister 166 (i.e., suppresses the fuel vapor from being adsorbed in the canister 166).

In the case of operating the engine 22 with stop of operation of the supercharger 140, the pressure on the downstream side of the throttle valve 126 in the intake pipe 123 becomes a negative pressure that is lower than the atmospheric pressure, and the check valve 170 is opened. In this state, when the on-off valve 162 and the duty valve 169 are opened by the engine ECU 24, the vaporized fuel gas flowing from the inside of the fuel tank 21 into the piping 161, the atmosphere flowing through the piping 167, the canister 166 and the piping 165 into the piping 161, and the fuel vapor released from the canister 166 along with the flow of the atmosphere to flow into the piping 161 flow to the downstream side of the throttle valve 126 in the intake pipe 123. The flow of the atmosphere suppresses the vaporized fuel gas that flows from the inside of the fuel tank 21 into the piping 161, from flowing into the canister 166 (i.e., suppresses the fuel vapor from being adsorbed in the canister 166). Regulating the opening position of the duty valve 169 regulates, for example, the flow rate of the vaporized fuel gas flowing in the intake pipe 123. According to the embodiment, in the case of operating the engine 22 with stop of operation of the supercharger 140, the on-off valve 172 is not controlled by the engine ECU 24 but is kept closed.

In the case of operating the engine 22 with operation of the supercharger 140, the pressure on the downstream side of the throttle valve 126 in the intake pipe 123 becomes a positive pressure that is higher than the atmospheric pressure, and the check valve 170 is closed. In this state, the duty valve 169 is not controlled by the engine ECU 24 but is kept closed. In this state, the engine ECU 24 performs a processing routine of FIG. 3 repeatedly. Additionally, in this state, the on-off valves 162 and 172 are not controlled by the engine ECU 24 but are kept closed, except during valve-opening control by the processing routine of FIG. 3. Keeping the on-off valve 162 closed suppresses the vaporized fuel gas in the fuel tank 21 from flowing into the canister 166 (i.e., suppresses the fuel vapor from being adsorbed in the canister 166).

Figure 3:
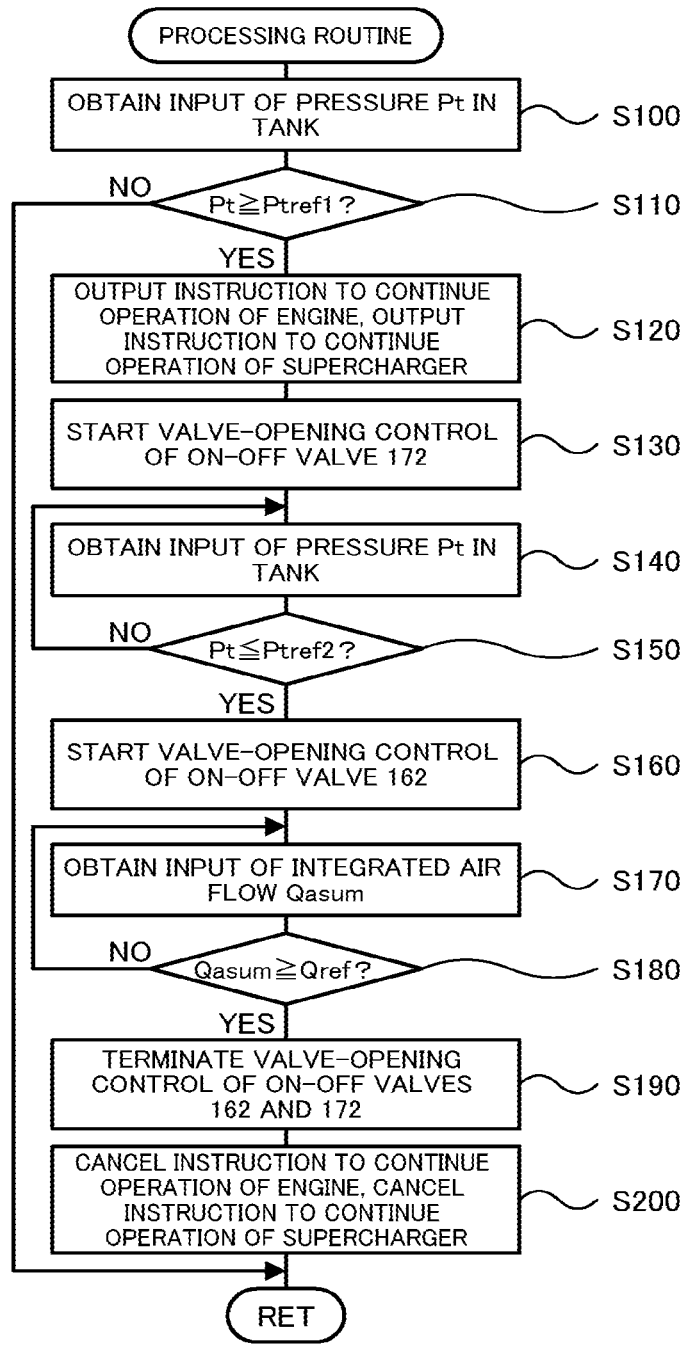
FIG. 3 is a flowchart showing one example of a processing routine performed by the engine ECU 24.

When the processing routine of FIG. 3 is triggered, the engine ECU 24 obtains the input of the pressure Pt in the fuel tank 21 (gauge pressure) from the pressure sensor 21a (step S100) and compares the input pressure Pt in the fuel tank 21 with a reference value Ptref1 (step S110). The reference value Ptref1 is a threshold value used to determine whether there is a demand for depressurization in the fuel tank 21 and is, for example, about 2.0 kPa to 3.0 kPa as the positive pressure. When the pressure Pt in the fuel tank 21 is lower than the reference value Ptref1 at step S110, the engine ECU 24 determines that there is no demand for depressurization in the fuel tank 21 and terminates this routine without any further processing.

When the pressure Pt in the fuel tank 21 is equal to or higher than the reference value Ptref1 at step S110, on the other hand, the engine ECU 24 determines that there is a demand for depressurization in the fuel tank 21, outputs an instruction to continue the operation of the engine 22 and an instruction to continue the operation of the supercharger 140 (step S120) and starts valve-opening control of the on-off valve 172 (step S130). The on-off valve 172 is configured as a normally-closed on-off valve and is thus opened by the start of the valve-opening control.

After outputting the instruction to continue the operation of the engine 22 and the instruction to continue the operation of the supercharger 140, the engine ECU 24 controls the engine 22 and the supercharger 140 (the waste gate valve 144) such that the engine 22 is operated along with the operation of the supercharger 140 until at least cancellation of these instructions.

When the valve-opening control of the on-off valve 172 is started, the vaporized fuel gas in the fuel tank 21 is supplied through the piping 171 to the upstream side of the compressor 141 in the intake pipe 123, so that the pressure Pt in the fuel tank 21 is decreased. According to the embodiment, the buffer portion 173 is provided on the intake pipe 123-side of the on-off valve 172 in the piping 171. When the on-off valve 172 is opened, at least part of the fuel vapor included in the vaporized fuel gas from the fuel tank 21 is once adsorbed in the buffer portion 173, is then released, and is supplied to the intake pipe 123. This configuration suppresses a large amount of the fuel vapor from being abruptly supplied to the intake pipe 123 when the on-off valve 172 is opened and thereby suppresses an abrupt change in the air fuel ratio AF of the engine 22. As a result, this configuration suppresses deterioration of emission and deterioration of the drivability of the hybrid vehicle 20 with the engine device mounted thereon.

The engine ECU 24 subsequently obtains the input of the pressure Pt in the fuel tank 21 (gauge pressure) (step S140) and compares the input pressure Pt in the fuel tank 21 with a reference value Ptref2 that is lower than the reference value Ptref1 (step S150). The reference value Ptref2 is a threshold value used to determine whether the depressurization in the fuel tank 21 is to be terminated or not and is, for example, 0 kPa (atmospheric pressure) or a value slightly higher than 0 kPa. When the pressure Pt in the fuel tank 21 is higher than the reference value Ptref2 at step S150, the engine ECU 24 returns to the processing of step S140.

When the pressure Pt in the fuel tank 21 becomes equal to or lower than the reference value Ptref2 at step S150 by the repetition of the processing of steps S140 and S150, the engine ECU 24 starts valve-opening control of the on-off valve 162 (step S160). The on-off valve 162 is configured as a normally-closed on-off valve and is thus opened by the start of the valve-opening control.

In this state, it is expected that the engine 22 is operated along with the operation of the supercharger 140, so that the pressure on the upstream side of the compressor 141 in the intake pipe 123 is a negative pressure. Accordingly, when the on-off valve 162 is opened under the pressure Pt in the fuel tank 21 that is equal to or lower than the reference value Ptref2, the outside air is supplied through the piping 167 (including the air filter 168), the canister 166, the piping 165, the piping 161 (including the on-off valve 162) and the piping 171 (including the on-off valve 172 and the buffer portion 173) to the upstream side of the compressor 141 in the intake pipe 123. This configuration enables the fuel vapor adsorbed in the buffer portion 173 to be further released and supplied to the intake pipe 123.

The engine ECU 24 subsequently obtains the input of an integrated air flow Qasum that is an integrated value of the intake air flow Qa since the start of the valve-opening control of the on-off valve 162 (step S170) and compares the input integrated air flow Qasum with a reference value Qref (step S180). The reference value Qref is a threshold value used to determine whether the fuel vapor adsorbed in the buffer portion 173 is sufficiently released (or more preferably, fully released). When the integrated air flow Qasum is lower than the reference value Qref at step S180, the engine ECU 24 returns to the processing of step S170.

When the integrated air flow Qasum becomes equal to or higher than the reference value Qref at step S180 by the repetition of the processing of steps S170 and S180, the engine ECU 24 terminates the valve-opening control of the on-off valves 162 and 172 (step S190), outputs cancellation of the instruction to continue the operation of the engine 22 and the instruction to continue the operation of the supercharger 140 (step S200), and then terminates this routine. The on-off valves 162 and 172 are configured as the normally-closed on-off valves and are thus closed by the termination of the valve-opening control. In response to the cancellation of the instruction to continue the operation of the engine 22 and the instruction to continue the operation of the supercharger 140, it is allowed to stop the operation of the engine 22 and stop the operation of the supercharger 140. In the state that the on-off valves 162 and 172 are opened, continuation of the operation of the engine 22 and the operation of the supercharger 140 causes the pressure on the upstream side of the compressor 141 in the intake pipe 123 to be a negative pressure. This configuration accordingly suppresses the fuel vapor supplied to the upstream side of the compressor 141 in the intake pipe 123 from flowing back through the intake pipe 123 and the air cleaner 122 and from being discharged from an intake port to the outside.

In the engine device mounted on the hybrid vehicle 20 according to the embodiment described above, the fuel vapor processor 160 includes the buffer portion 173 that is located on the intake pipe 123-side of the on-off valve 172 in the piping 171. When the on-off valve 172 is opened, this configuration causes at least part of the fuel vapor included in the vaporized fuel gas from the fuel tank 21 to be once adsorbed in the buffer portion 173, to be then released and to be supplied to the intake pipe 123. This configuration suppresses a large amount of the fuel vapor from being abruptly supplied to the intake pipe 123 when the on-off valve 172 is opened and thereby suppresses an abrupt change in the air fuel ratio AF of the engine 22. As a result, this configuration suppresses deterioration of emission and deterioration of the drivability of the hybrid vehicle 20 with the engine device mounted thereon.

In the engine device mounted on the hybrid vehicle 20 according to the embodiment, after causing the on-off valve 172 to be opened, the engine ECU 24 causes the on-off valve 162 to be opened when the pressure Pt in the fuel tank 21 becomes equal to or lower than the reference value Ptref2. According to a modification, after causing the on-off valve 172 to be opened, the engine ECU 24 may cause the on-off valve 162 to be opened when a predetermined time period T1 has elapsed. The predetermined time period T1 is set as a time period when the depressurization in the fuel tank 21 is to be terminated.

In the engine device mounted on the hybrid vehicle 20 according to the embodiment, after causing the on-off valve 172 to be opened and subsequently causing the on-off valve 162 to be opened, the engine ECU 24 causes the on-off valves 162 and 172 to be closed when the integrated air flow Qasum becomes equal to or higher than the reference value Qref. According to a modification, after causing the on-off valve 172 to be opened and subsequently causing the on-off valve 162 to be opened, the engine ECU 24 may cause the on-off valves 162 and 172 to be closed when a predetermined time period T2 has elapsed.

In the engine device mounted on the hybrid vehicle 20 according to the embodiment, the engine ECU 24 causes the on-off valve 162 to be opened when the pressure Pt in the fuel tank 21 becomes equal to or lower than the reference value Ptref2 after causing the on-off valve 172 to be opened, and subsequently causes the on-off valves 162 and 172 to be closed when the integrated air flow Qasum becomes equal to or higher than the reference value Qref. According to a modification, when the pressure Pt in the fuel tank 21 becomes equal to or lower than the reference value Ptref2 after causing the on-off valve 172 to be opened, the engine ECU 24 may not cause the on-off valve 162 to be opened (i.e., may keep the on-off valve 162 closed) and may cause the on-off valve 172 to be closed.

In the engine device mounted on the hybrid vehicle 20 of the embodiment, the one end side of the piping 171 of the fuel vapor processor 160 is connected with the fuel tank 21-side of the on-off valve 162 in the piping 161. According to a modification, however, the one end side of the piping 171 may be directly connected with the fuel tank 21.

In the engine device mounted on the hybrid vehicle 20 of the embodiment, the supercharger 140 used is the turbo charger including the compressor 141, the turbine 142 and the rotating shaft 143. According to a modification, however, the supercharger 140 used may be a supercharger configured such that a compressor driven by the engine 22 or a motor is placed in the intake pipe 123.

According to the embodiment, the engine device is mounted on the hybrid vehicle that is provided with the engine 22, the two motors MG1 and MG2 and the planetary gear 30. The engine device may be mounted on a hybrid vehicle of any configuration with an engine mounted thereon or may be mounted on a conventional motor vehicle without a motor for driving. The engine device may also be mounted in stationary equipment such as construction equipment.

In the engine device of the present disclosure, the engine device may include a controller programmed to control the fuel vapor processor, while the supercharge operates during operation of the engine and the first valve is closed, when a pressure in the fuel tank becomes equal to or higher than a predetermined pressure, the controller may cause the second valve to be opened. This configuration enables depressurization in the fuel tank to be performed.

In this case, the fuel vapor processor may include a canister connected with an intake pipe side of the first valve in the first supply pipe via a first piping, opened to atmosphere via a second piping, and configured to adsorb the fuel vapor; a third valve provided on an intake pipe side of a connecting position with the first piping in the first supply pipe; and a check valve provided on an intake pipe side of the third valve in the first supply pipe and opened by a negative pressure on a downstream side of the compressor in the intake pipe, and when the pressure in the fuel tank becomes equal to or lower than a second predetermined pressure that is lower than the predetermined pressure in an open state of the second valve, the controller may open the first valve while keeping the second valve opened. This configuration causes the outside air to be supplied through the second piping, the canister, the first piping, the first intake pipe (including the first valve), and the second supply pipe (including the second valve and the buffer portion) to the upstream side of the compressor in the intake pipe. This configuration enables the fuel vapor adsorbed in the buffer portion to be further released and supplied to the intake pipe.

In this case, after opening the first valve while keeping the second valve opened, the controller may keep both the first valve and the second valve opened until satisfaction of a predetermined condition. In this case, the controller may cause operation of the engine to be continued until satisfaction of the predetermined condition. In this case, the controller may cause operation of the supercharger to be continued until satisfaction of the predetermined condition. The predetermined condition may include at least one of a condition that a predetermined time period has elapsed and a condition that an integrated value of an intake air flow of the engine becomes equal to or higher than a reference value.

The following describes the correspondence relationship between the primary elements of the above embodiment and the primary elements of the disclosure described in Summary. In the embodiment, the engine 22 corresponds to the "engine", the supercharger 140 corresponds to the "supercharger", and the fuel vapor processor 160 corresponds to the "fuel vapor processor". In the embodiment, the engine ECU 24 corresponds to the "controller".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure is preferably applicable to the manufacturing industries of the engine device and so on.

What is claimed is:

1. An engine device, comprising:
an engine configured to receive a supply of a fuel from a fuel tank and output a power;
a supercharger having a compressor that is placed in an intake pipe of the engine; and
a fuel vapor processor comprising a first supply pipe configured to supply a vaporized fuel gas including fuel vapor generated in the fuel tank, to a downstream side of the compressor in the intake pipe; a first valve provided in the first supply pipe; a second supply pipe configured to supply the vaporized fuel gas to an upstream side of the compressor in the intake pipe; a second valve provided in the second supply pipe; and a buffer portion provided on an intake pipe side of the second valve in the second supply pipe and configured to adsorb at least part of the fuel vapor.

2. The engine device according to claim 1, further comprising:
a controller programmed to control the fuel vapor processor wherein
while the supercharge operates during operation of the engine and the first valve is closed, when a pressure in the fuel tank becomes equal to or higher than a predetermined pressure, the controller causes the second valve to be opened.

3. The engine device according to claim 2,
wherein the fuel vapor processor further comprises a canister connected with an intake pipe side of the first valve in the first supply pipe via a first piping, opened to atmosphere via a second piping, and configured to adsorb the fuel vapor; a third valve provided on an intake pipe side of a connecting position with the first piping in the first supply pipe; and a check valve provided on an intake pipe side of the third valve in the first supply pipe and opened by a negative pressure on a downstream side of the compressor in the intake pipe, and wherein
when the pressure in the fuel tank becomes equal to or lower than a second predetermined pressure that is lower than the predetermined pressure in an open state of the second valve, the controller opens the first valve while keeping the second valve opened.

4. The engine device according to claim 3,
wherein after opening the first valve while keeping the second valve opened, the controller keeps both the first valve and the second valve opened until satisfaction of a predetermined condition.

5. The engine device according to claim 4,
wherein the controller causes operation of the engine to be continued until satisfaction of the predetermined condition.

6. The engine device according to claim 5,
wherein the controller causes operation of the supercharger to be continued until satisfaction of the predetermined condition.

7. The engine device according to claim 4,
wherein the predetermined condition includes at least one of a condition that a predetermined time period has elapsed and a condition that an integrated value of an intake air flow of the engine becomes equal to or higher than a reference value.

* * * * *